United States Patent [19]
Lee

[11] Patent Number: 5,940,236
[45] Date of Patent: *Aug. 17, 1999

[54] APPARATUS FOR PREVENTING A RECORDING ON A VIDEO CASSETTE TAPE LOADED IN A VIDEO CASSETTE RECORDER

[75] Inventor: Chang-Ho Lee, Seoul, Rep. of Korea

[73] Assignee: Daewoo Electronics Co., Ltd., Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/656,124

[22] Filed: May 30, 1996

[30] Foreign Application Priority Data

May 30, 1995 [KR] Rep. of Korea ............... 95-13823

[51] Int. Cl.⁶ ............................................. G11B 15/48

[52] U.S. Cl. ............................ 360/74.2; 360/60; 360/85

[58] Field of Search .................. 360/74.2, 60, 74.5, 360/85

[56] References Cited

U.S. PATENT DOCUMENTS

| | | | |
|---|---|---|---|
| 3,752,486 | 8/1973 | Nakamura | 360/60 |
| 4,107,743 | 8/1978 | Mestdagh | 360/60 |
| 4,495,535 | 1/1985 | Kohri et al. | 360/96.3 |
| 4,602,302 | 7/1986 | Haruta | 360/74.2 |
| 5,400,980 | 3/1995 | Yoshikawa | 360/74.2 |
| 5,475,541 | 12/1995 | Kim | 360/60 |

*Primary Examiner*—Andrew L. Sniezek
*Attorney, Agent, or Firm*—Pennie & Edmonds LLP

[57] ABSTRACT

A video cassette recorder includes an arm for connecting an intermediate gear driven by a capstan motor and an idler gear, a reel sensor for recognizing whether a supply reel table rotates or not, and a lever for selectively limiting the shifting movement of the idler gear to the supply reel table. The lever is provided on a deck so as to selectively come into contact with the arm oscillating toward the supply reel table in response to the movement of a sliding plate, or the presence or absence of a record tab on a loaded video cassette tape when the video cassette recorder is in a record mode and to keep a non-contacting status with respect to the arm when the video cassette recorder is in another operating mode.

12 Claims, 8 Drawing Sheets

APPARATUS FOR PREVENTING A RECORDING ON A VIDEO CASSETTE TAPE LOADED IN A VIDEO CASSETTE RECORDER

FIELD OF THE INVENTION

The present invention relates to a video cassette recorder ("VCR"); and, more particularly, to an apparatus capable of selectively performing a recording operation on a video cassette tape loaded therein depending on a presence or an absence of a record tab.

DESCRIPTION OF THE PRIOR ART

As is well known, a video cassette tape is, on a rear portion thereof, provided with a hole for preventing an unwanted recording thereon, the hole being covered with a record tab when otherwise. Consequently, the VCR is equipped with an apparatus for detecting whether the hole is covered with the record tab or not.

As shown in FIG. 1, there is shown a schematic diagram of a deck 1 of a VCR and a video cassette tape 30 loaded therein. The deck 1 of the VCR is provided with a head drum assembly 2, a full-erasing head 3, an audio control head 4, a capstan assembly 10, an idler gear 11 and an intermediate gear 12. In addition, the cassette 30 loaded in the VCR includes a magnetic tape T wrapped around a supply reel 21 and a take-up reel 22.

When the video cassette tape 30 is loaded and the VCR is in an appropriate operating mode, e.g., play, record, etc., the magnetic tape T is pulled forward and brought into contact with the head drum assembly 2, the full-erasing head 3 and the audio control head 4 by a couple of pole base assemblies (not shown). It should be noted that the arrangement of the VCR components portrayed in FIG. 1 may differ when the VCR is in other operating modes, e.g. rewind or fast forward.

FIG. 2 shows a perspective view of a conventional apparatus 50 for selectively performing a recording operation on a video cassette tape loaded therein depending on a presence or an absence of a record tab; and FIGS. 3A and 3B are plan views illustrating the operating principles thereof.

As shown in FIG. 2, the apparatus 50 includes a substantially L-shaped lever 51, a spring 53, and a switch 55. The L-shaped lever 51 includes a record tab detecting protrusion 51a on one arm and a switch contacting portion 51b on the other arm. Further, the L-shaped lever 51 is capable of pivoting clockwise or counter-clockwise about its elbow, i.e., a point at which the two arms come together.

As shown in FIG. 3A, when the video cassette tape 30 whose hole 31 is not covered with the record tab is loaded in the VCR and the user selects the record mode, the record tab detecting protrusion 51a of the L-shaped lever 51 is forced into the hole 31 of the video cassette tape 30, thereby preventing the switch contacting portion 51b thereof from coming in contact with a switch 55. Thus, the switch 55 remains "OFF" state, and nothing gets recorded on the loaded video cassette tape.

Otherwise, as shown in FIG. 3B, when the video cassette tape 30 whose hole is covered with the record tab 32 is loaded into the VCR and the user selects the record mode, the record tab 32 prevents the record tab detecting protrusion 51a of the L-shaped lever 51 from being inserted into the hole, which, in turn, forces the switch contacting portion 51b thereof to come into contact with the switch 55. Thus, the switch 55 becomes "ON" state. Consequently, the VCR goes through the recording operation.

SUMMARY OF THE INVENTION

It is, therefore, a primary object of the invention to provide to a novel apparatus capable of selectively performing a recording operation on a video cassette tape loaded in a video cassette recorder depending on a presence or an absence of a record tab.

In accordance with one aspect of the present invention, there is provided a video cassette recorder incorporating therein a deck, a supply reel and a take-up reel tables rotatably mounted on the deck, an idler gear disposed between the supply reel and the take-up reel tables for transmitting selectively its driving force to either the supply reel or the take-up reel tables, and an intermediate gear driven by a capstan motor, comprising: an arm for mechanically connecting the intermediate gear and the idler gear; a sliding plate whose movement depends on an operating mode of the VCR; a reel sensor for recognizing whether the supply reel table rotates or not; and means for selectively limiting the shifting movement of the idler gear into the supply reel table depending on a presence or an absence of a record tab.

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 1:
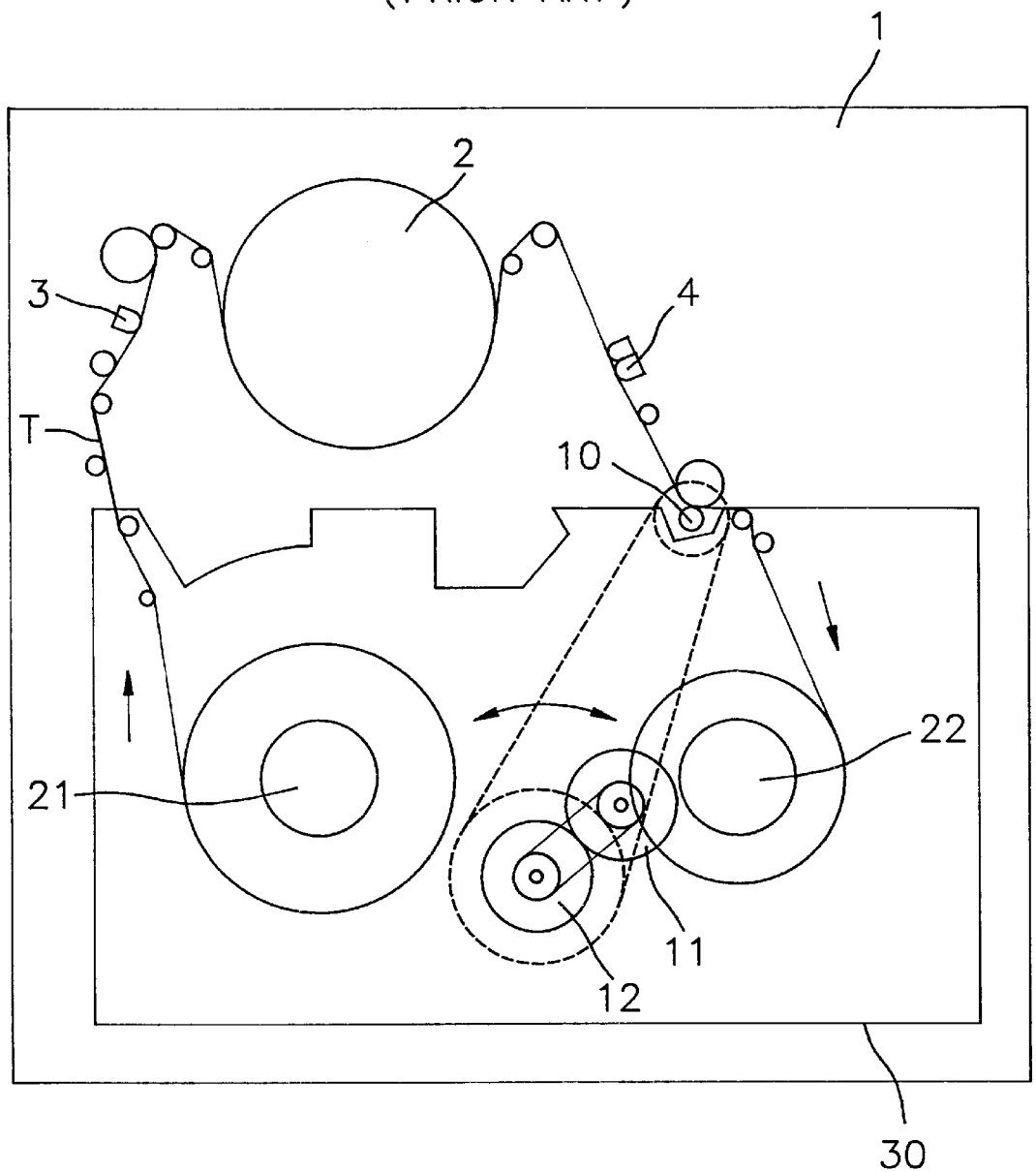
FIG. 1 shows a schematic diagram of a deck of a VCR and a video cassette tape loaded therein.
Figure 2:
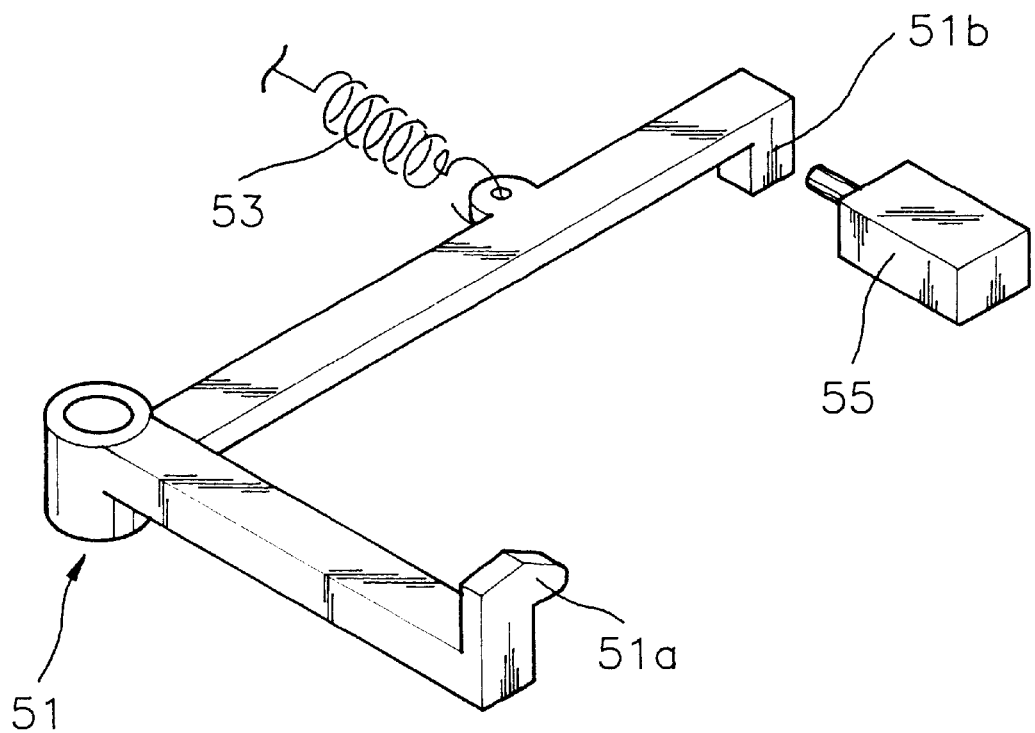
FIG. 2 illustrates a perspective view of a conventional apparatus for selectively performing a recording operation on a video cassette tape loaded therein depending on a presence or an absence of a record tab.
Figure 3A:
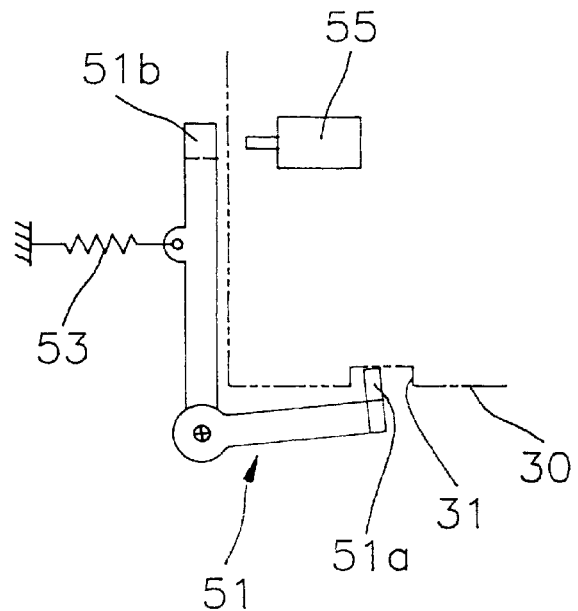
FIGS. 3A and 3B are plan views for illustrating the operating principles of the conventional apparatus shown in FIG. 2.
Figure 3B:
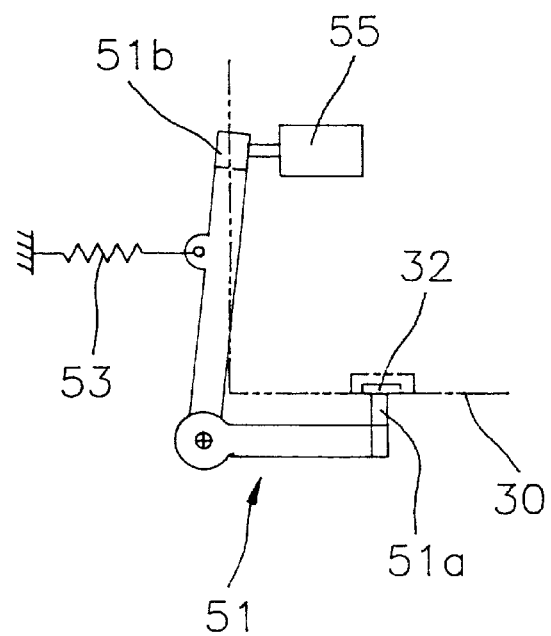
Figure 4:
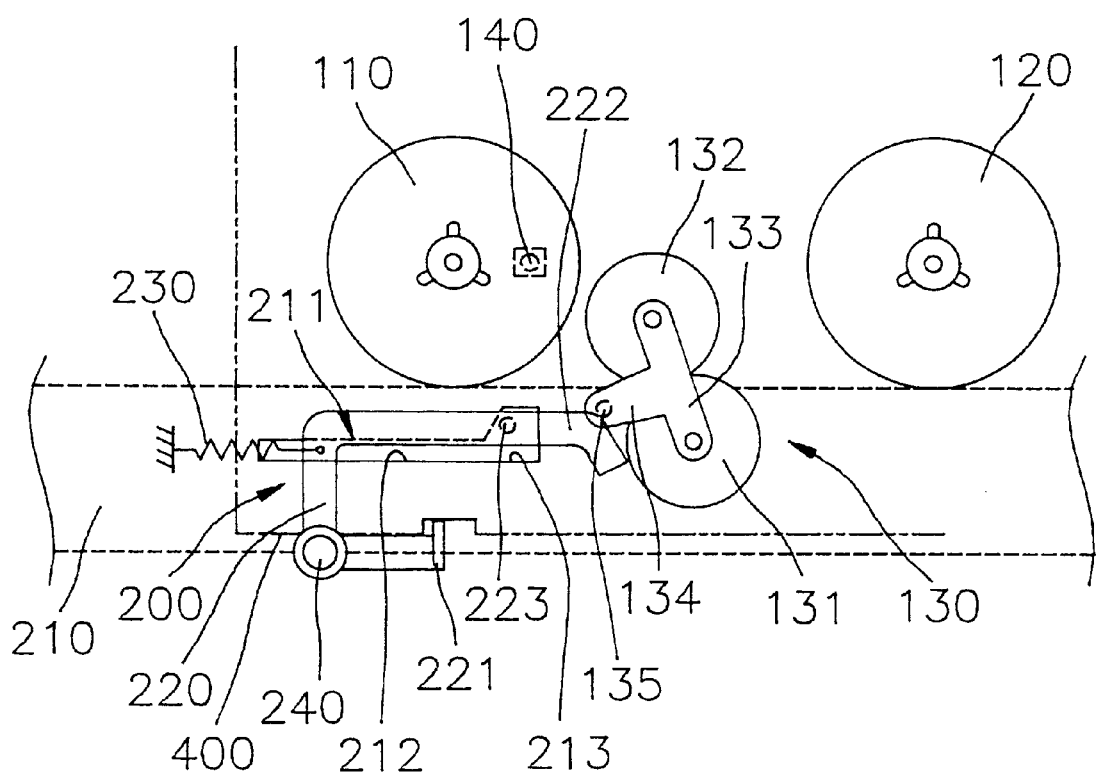
FIG. 4 represents a partial plan view of a VCR incorporating therein an apparatus for selectively performing a recording operation on a video cassette tape loaded therein depending on a presence or an absence of a record tab in accordance with the present invention, the loaded video cassette tape being not provided with a record tab.

Referring to FIG. 4, there is shown a partial plan view of a VCR incorporating therein an apparatus 200 for selectively performing a recording operation on a video cassette tape loaded therein depending on a presence or an absence of a record tab in accordance with the present invention.

As shown, the VCR comprises a supply reel table 110, a tape-up reel table 120, a reel driving mechanism 130 and the inventive apparatus 200.

The reel driving mechanism 130 includes an intermediate gear 131 driven by a capstan motor (not shown) and an idler gear 132 engaged with the intermediate gear 131 to be selectively shifted to either the supply reel table 110 or the take-up reel table 120 depending on an operating mode of the VCR. The intermediate and the idler gears 131, 132 are connected by an arm 133, wherein the arm 133 is provided with a protruding portion 134 extending toward the supply reel table 110 and having a locking pin 135 on a bottom surface thereof. Further, on a lower portion of the supply reel table 110, there is located a reel sensor 140 for sensing whether the supply reel table 110 is rotating or not.

The inventive apparatus 200 includes a sliding plate 210 whose movement depends on the operating mode of the VCR, a limiting lever 220 rotatably mounted on a deck (not shown) and a spring 230.

Figure 7:
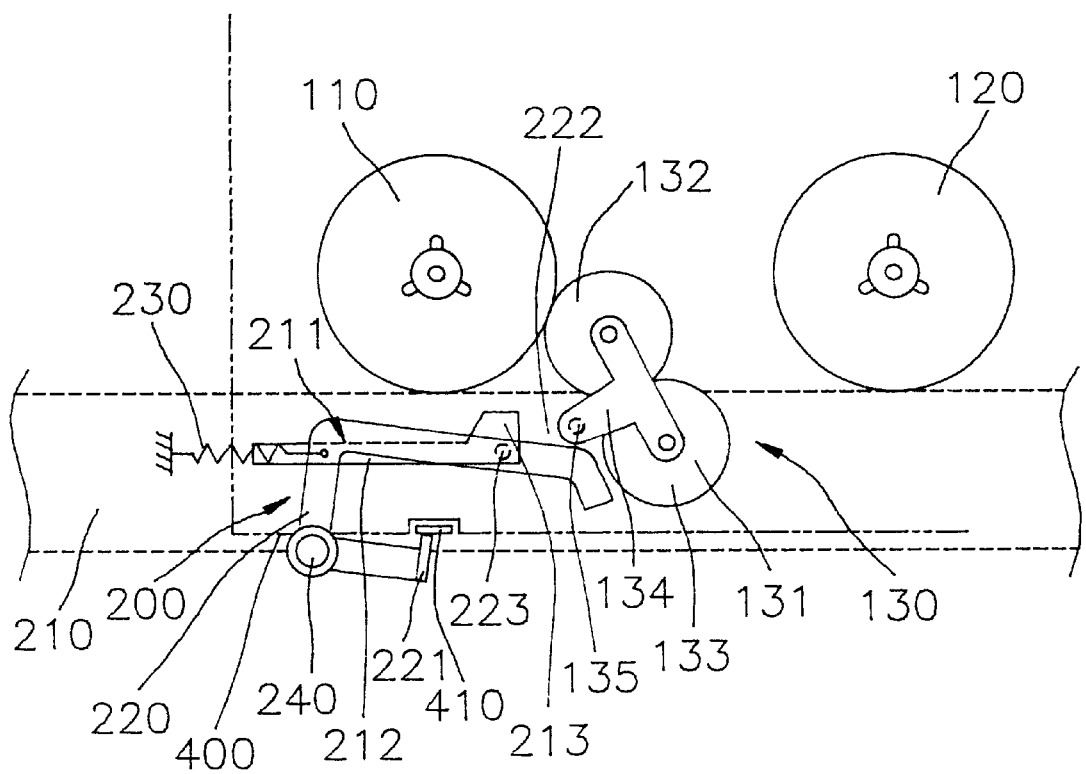
FIG. 7 displays a partial plan view of a VCR incorporating therein the inventive apparatus, the loaded video cassette tape being provided with the record tab.

The sliding plate 210 is formed with a cam groove 211 for limiting the movement of the limiting lever 220, wherein the cam groove 211 is divided into a narrow portion 212 for preventing the limiting lever 220 from coming into contact with the locking pin 135, regardless of the presence or absence of the record tab and a wide portion 213 for allowing the limiting lever 220 to freely move depending on the presence or absence of a record tab 410 (as shown in FIG. 7).

One end of the limiting lever 220 is provided with an record tab detecting protrusion 221 and the other end thereof is provided with a bent portion 222 selectively coming into contact with the locking pin 135 of the arm 133. Furthermore, the limiting lever 220 is, on its bottom surface, provided with a limiting pin 223 extending downward, wherein the limiting pin 223 is inserted into the cam groove 211 of the sliding plate 210 and used for selectively limiting the limiting lever 220 depending on the operating mode of the VCR or a presence or an absence of a record tab on a video cassette tape.

One end of the spring 230 is fixed to the deck and the other end thereof is fixed to the limiting lever 220 in such a way that the limiting lever 220 is permitted to elastically turn about a shaft 240 secured to the deck.

Figure 5:
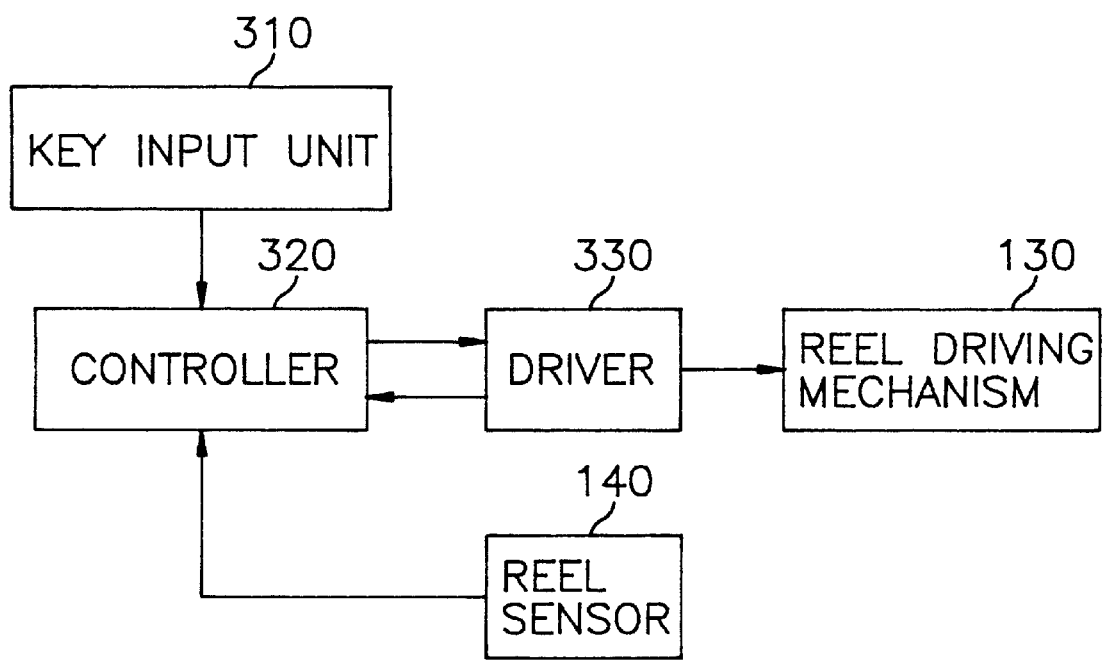
FIG. 5 offers a system block diagram of the inventive apparatus.

There is shown in FIG. 5 a system block diagram of the inventive apparatus 200, illustrating a key input unit 310, a controller 320, a driver 330, the reel driving mechanism 130 and the reel sensor 140. The key input unit 310 is operated by a user and outputs a selection signal to the controller 320.

The controller 320 commands the driver 330 to apply a drive signal to the reel driving mechanism 130.

The reel sensor 140 senses whether the supply reel table 110 is rotating or not and applies a detection signal to the controller 320.

Figure 6:
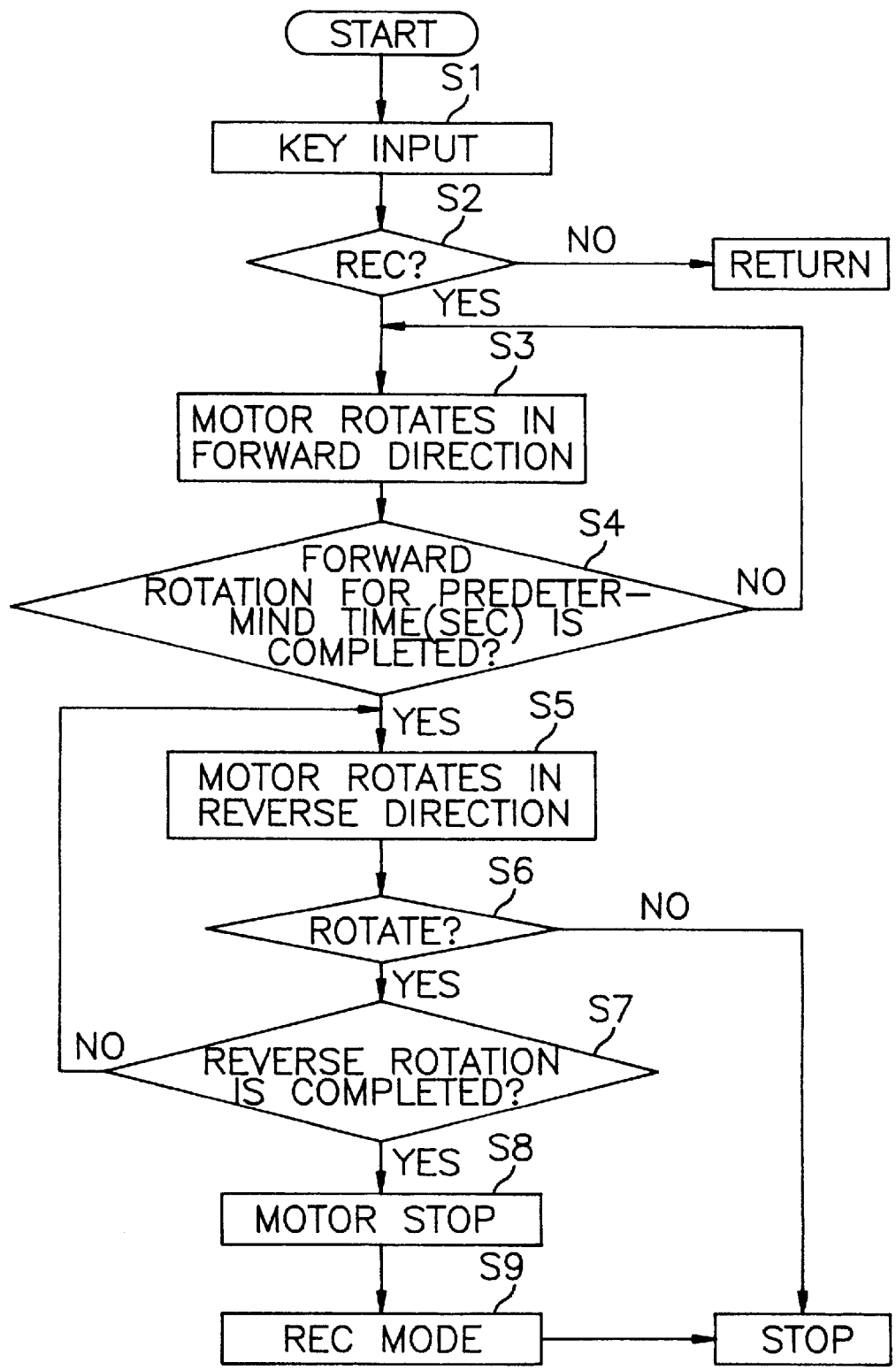
FIG. 6 depicts a flow chart illustrating the operating steps of the inventive apparatus.

There is depicted is FIG. 6 a flow chart illustrating the operating steps.

After the video cassette tape is loaded in the VCR, in step S1, when the user selects the record mode, the key input unit 310 outputs a record selection signal. In step S2, the controller 320 checks whether the selection signal from the key input unit 310 is a record mode or not and if it is the record mode, the process proceeds to step S3, but if not, returns to the main process. Subsequently, the capstan motor rotates in a forward direction for a predetermined time to rotate the take-up reel table 120 via the intermediate gear 131 and the idler gear 132 (step S3). The controller 320 determines whether or not the rotation of the capstan motor is completed (step S4) and if the rotation thereof is completed, the process proceeds to step S5, but if not, returns to the step S3. In step S5, the controller 320 forces the capstan motor to rotate in a reverse direction so that the idler gear 132 is permitted to be shifted to the supply reel table 110. At this time, as shown in FIG. 7, if the loaded video cassette tape 400 is provided with a record tab 410, the limiting lever 220 is rotated clockwise due to the record tab detecting protrusion 221 thereof contacting the record tab 410, keeping the bent portion 222 thereof apart from the locking pin 135 of the arm 133. Thus, the idler gear 132 is freely shifted to the supply reel table 110, thereby rotating it. However, as shown in FIG. 4, when the loaded video cassette tape is not provided with the record tab, the bent portion 222 of the limiting lever 220 comes into contact with the locking pin 135, thereby restricting the shifting movement of the idler gear 132 into the supply reel table 110, which, in turn, prevents the supply reel table 110 from rotating. Thus, in step S6, the reel sensor 140 recognizes whether or not the supply reel table 110 is rotating and if it is rotating, the process proceeds to step S7 but if not, it is stopped. In step S7, the reel sensor 140 detects whether the rotation of the supply reel table 110 is completed and if the rotation thereof is completed, the recording operation of the VCR is performed (step S9) via step S8 which stops the rotation of the capstan motor, but if not, it returns to step S5.

In the above description, the limiting pin 223 of the limiting lever 220 is inserted into the wide portion 213 of the cam groove 211 in such a way that the limiting lever 220 moves freely depending on the presence or absence of the record tab 410.

Figure 8:
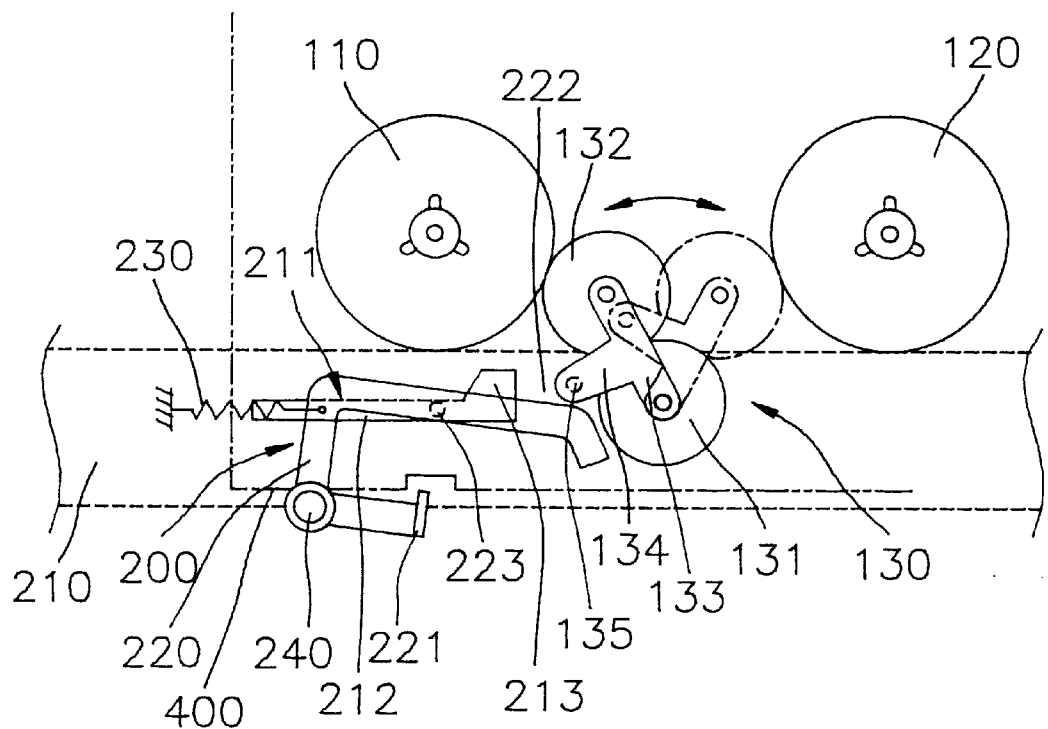
FIG. 8 provides a partial plan view of a VCR incorporating therein the inventive apparatus, the VCR being in rewind or rewind search modes.

However, as shown in FIG. 8, when the VCR is in a rewind or a review modes, the limiting pin 223 is positioned on a cam face of the narrow portion 212 of cam groove 211, and the limiting lever 220 is in a same posture as that of the limiting lever 220 shown in FIG. 7, regardless of the presence or the absence of the record tab. Thus, the idler gear 132 is freely shifted into either of the supply reel or the take-up reel tables.

While the present invention has been shown and described with reference to the particular embodiments, it will be apparent to those skilled in the art that many changes and modifications may be made without departing from the spirit and scope of the invention as defined in the appended claims.

What is claimed is:

1. A video cassette recorder incorporating therein a deck and a supply reel and a take-up reel tables rotatably mounted on the deck, the video cassette recorder comprising:

an idler gear pivotally mounted between the supply reel table and the take-up reel table, wherein upon video cassette recorder being in a record mode the idler gear is shifted to the take-up reel table to rotate the take-up reel table for a predetermined time and then shifted toward the supply reel table;

means for limiting the shifting movement of the idler gear into the supply reel table when the video cassette recorder is in the record mode, and a loaded video cassette tape is not provided with a record tab, and for allowing the idler gear to freely shift to the supply reel table when the video cassette recorder is in the record mode and the loaded video cassette tape is provided with a record tab or when the video cassette recorder is in the reverse direction modes; and a reel sensor for recognizing whether or not the supply reel table is rotating and whether the rotation of the supply reel table is completed, when the video cassette recorder is in the record mode.

2. A video cassette recorder incorporating therein a deck having a capstan motor and a supply reel and a take-up reel tables rotatably mounted on the deck, the video cassette recorder comprising:

an intermediate gear driven by the capstan motor;

an idler gear pivotally mounted between the supply reel table and the take-up reel table, wherein upon video cassette recorder being in a record mode the idler gear is shifted to the take-up reel table to rotate the take-up reel table for a predetermined time and then shifted toward the supply reel table;

an arm for mechanically connecting the intermediate gear and the idler gear;

a sliding plate whose movement depends on the operating mode of the video cassette recorder;

means for limiting the shifting movement of the idler gear into the supply reel table when the video cassette recorder is in the record mode, and a loaded video cassette tape is not provided with a record tab, and for allowing the idler gear to freely shift to the supply reel table when the video cassette recorder is in the record mode and the loaded video cassette tape is provided with a record tab or when the video cassette recorder is in the reverse direction modes; and a reel sensor for recognizing whether or not the supply reel table is rotating and whether the rotation of the supply reel table is completed, when the video cassette recorder is in the record mode.

3. The video cassette recorder of claim 2, wherein the arm is provided with a protruding portion extending toward the supply reel table and having a locking pin on a bottom surface thereof and the selectively limiting means includes a limiting lever pivotably mounted on the deck, one end of the limiting lever being provided with a record tab detecting projection and being, at the other end thereof, provided with a bent portion selectively coming into contact with the locking pin so as to selectively restrict the shifting movement of the idler gear into the supply reel table, whereby, when the video cassette recorder is in the record mode and the record tab is present, the supply reel table is rotated by engaging with the idler gear and when the video cassette recorder is in the record mode and the record tab is absent, the supply reel table is not rotated.

4. The video cassette recorder of claim 3, wherein the limiting lever is further provided with a limiting pin for keeping the bent portion of the limiting lever apart from the locking pin of the arm in response to the movement of the sliding plate.

5. The video cassette recorder of claim 4, wherein the sliding plate is formed with a cam groove for limiting the movement of the limiting lever, the cam groove having a narrow portion for preventing the lever from coming into contact with the locking pin, regardless of the presence or absence of the record tab and a wide portion for selectively allowing the lever to move in response to the presence or absence of the record tab.

6. A video cassette recorder incorporating therein a deck having a capstan motor and a supply reel and a take-up reel tables rotatably mounted on the deck, the video cassette recorder comprising:

an idler gear shifted to the supply reel or the take-up reel table in response to a rotation of the capstan motor to be engaged with the supply reel or the take-up reel table, the idler gear being shifted to the take-up reel table for a predetermined time and then shifted to the supply reel table only when the video cassette recorder is in a record mode;

means for selectively limiting the shifting movement of the idler gear to the supply reel table, wherein the limiting means is provided on the deck in such a way that, when the video cassette recorder is in the record mode and a loaded video cassette tape is not provided with a record tab, the limiting means selectively limits the shifting movement of the idler gear to the supply reel table and when the video cassette recorder is in the record mode and the loaded video cassette tape is provided with the record tab or when the video cassette recorder is in other operating mode, the limiting means allows the idler gear to freely shift to the supply reel table; and a reel sensor for recognizing whether the supply reel table rotates or not when the video cassette recorder is in the record mode, whereby, when the video cassette recorder is in the record mode and the supply reel table rotates, the recording operation is performed.

7. A video cassette recorder incorporating therein a deck having a capstan motor, and a supply reel and a take-up reel tables rotatably mounted on the deck, the video cassette recorder comprising:

an idler gear shifted to the supply reel or the take-up reel tables in response to a rotation of the capstan motor to be engaged with the supply reel or the take-up reel table, the idler gear being shifted to the take-up reel table for a predetermined time and then shifted to the supply reel table only when the video cassette recorder is in a record mode;

means for selectively limiting the shifting movement of the idler gear to the supply reel table, wherein the limiting means is provided on the deck in such a way that, when the video cassette recorder is in the record mode and a loaded video cassette tape is not provided with a record tab, the limiting means limits the shifting movement of the idler gear to the supply reel table and when the video cassette recorder is in the record mode and the loaded video cassette tape is provided with the record tab or when the video cassette recorder is in another operating mode, the limiting means allows the idler gear to freely shift to the supply reel table; and a reel sensor for recognizing whether the supply reel table rotates or not, whereby, when the video cassette recorder is in the record mode and the supply reel table rotates, the recording operation is performed.

8. The video cassette recorder of claim 7, further including:

an intermediate gear driven by the capstan motor;

an arm for mechanically connecting the intermediate gear and the idler gear;

a sliding plate whose movement depends on the operating mode of the video cassette recorder; and the limiting means is provided on the deck so as to selectively come into contact with the arm oscillating toward the supply reel table by rotating clockwise or counterclockwise in response to the movement of the sliding plate, or the presence or absence of the record tab on the loaded video cassette tape when the video cassette recorder is in the record mode and keep a non-contacting status with respect to the arm when the video cassette recorder is in another operating mode.

9. The video cassette recorder of claim 8, wherein the arm is provided with a protruding portion extending toward the supply reel table and having a locking pin on a bottom surface thereof and the limiting means includes a limiting lever pivotably mounted on the deck, one end of the limiting lever being provided with a record tab detecting projection and being, at the other end thereof, provided with a bent portion selectively coming into contact with the locking pin, the limiting lever further being provided with a limiting pin for keeping the bent portion of the limiting lever apart from the locking pin of the arm in response to the movement of the sliding plate.

10. The video cassette recorder of claim 9, wherein the sliding plate is formed with a cam groove for limiting the movement of the limiting lever, the cam groove having a narrow portion for preventing the lever from coming into contact with the locking pin, regardless of the presence or absence of the record tab and a wide portion for allowing the lever to freely move in response to the presence or absence of the record tab.

11. A video cassette recorder incorporating therein a deck having a capstan motor, spaced supply reel and take-up reel tables rotatably mounted on the deck, and an idler gear pivotally mounted between the supply reel table and the take-up reel table, the idler gear being driven by the capstan motor, the video cassette recorder being operatively associated with a video tape having a removable recording tab, wherein the video cassette recorder comprises:

a limiting lever for selectively limiting the movement of the idler gear between the supply reel and the take-up reel tables, the limiting lever pivotally mounted on the deck in such a way that, upon the video cassette recorder being in a record mode and the record tab being present the limiting lever allows the idler gear to shift into contact with and rotates the supply reel table, upon the video recorder being in the record mode and the record tab being absent the limiting lever allows the idler gear to be spaced from the supply reel table, upon the video cassette recorder being in another operating mode the limiting lever allows the idler gear to freely shift into contact with and rotate either the supply reel or the take-up table; and a reel sensor for recognizing whether the supply reel table rotates or not, whereby, when the video cassette recorder is in the record mode and the supply reel table rotates, the recording operation is performed.

12. The video cassette recorder of claim 11, wherein the video cassette recorder further includes:

an intermediate gear;

an arm pivotally mounted to the deck between the supply reel and the take-up reel tables, the arm having the intermediate gear and the idler gear rotatably mounted thereon, so that the capstan motor drives the idler gear using the intermediate gear, the arm further including a locking pin extending from a bottom surface thereof;

the limiting lever being tensionally biased toward the arm, the limiting lever further including one end provided with a recording tab detecting projection, the other end thereof being provided with a bent portion selectively coming into contact with the locking pin, and a limiting pin extending from the limiting lever; and a sliding plate including a cam groove having a narrow portion and a wide portion, the sliding plate being mounted to the deck so that the limiting pin is disposed within the cam groove;

upon the video cassette recorder being in the record mode the shifting plate moves until the limiting pin is within the wide portion of the cam groove and with the record tab present the limiting lever is biased away from the arm so that the bent portion is spaced from the locking pin and the idler gear to freely shift into contact with and rotate the supply reel table, and with the record tab absent the limiting lever is biased toward the arm so that the bent portion contacts the locking pin and allows the idler gear to be spaced from the supply reel table; upon the video recorder being in another mode the shifting plate moves until the limiting pin is within the narrow portion of the cam groove so that the bent portion is spaced from the locking pin and the idler gear can freely shift between contact with either the supply reel or the take-up reel tables.

* * * * *